US007657655B2

(12) United States Patent
Hampton

(10) Patent No.: US 7,657,655 B2
(45) Date of Patent: *Feb. 2, 2010

(54) METHOD AND SYSTEM TO DETERMINE THE GEOGRAPHIC LOCATION OF A NETWORK USER

(75) Inventor: Thomas H. Hampton, Hanover, NH (US)

(73) Assignee: Microsoft Corporation, Redmond, WA (US)

( * ) Notice: Subject to any disclaimer, the term of this patent is extended or adjusted under 35 U.S.C. 154(b) by 374 days.

This patent is subject to a terminal disclaimer.

(21) Appl. No.: 11/440,645

(22) Filed: May 24, 2006

(65) Prior Publication Data

US 2006/0212601 A1    Sep. 21, 2006

Related U.S. Application Data

(63) Continuation of application No. 09/812,304, filed on Mar. 19, 2001, now Pat. No. 7,062,572.

(51) Int. Cl.
*G06F 15/16* (2006.01)
(52) U.S. Cl. .................. 709/245; 709/215; 709/217
(58) Field of Classification Search ......... 709/217–219, 709/215, 245
See application file for complete search history.

(56) References Cited

U.S. PATENT DOCUMENTS

| 4,839,853 | A | 6/1989 | Deerwester et al. | 364/900 |
|---|---|---|---|---|
| 5,537,491 | A | 7/1996 | Mahoney et al. | 382/218 |
| 5,619,709 | A | 4/1997 | Caid et al. | 395/794 |
| 5,710,915 | A | 1/1998 | McElhiney | 395/603 |
| 5,748,805 | A | 5/1998 | Withgott et al. | 382/306 |
| 5,832,494 | A | 11/1998 | Egger et al. | 707/102 |
| 5,864,855 | A | 1/1999 | Ruocco et al. | 707/10 |
| 5,915,250 | A | 6/1999 | Jain et al. | 707/100 |
| 5,940,825 | A | 8/1999 | Castelli et al. | 707/6 |
| 5,974,412 | A | 10/1999 | Hazlehurst | 707/3 |
| 6,021,406 | A | 2/2000 | Kuznetsov | 707/6 |
| 6,151,631 | A | 11/2000 | Ansell et al. | 709/229 |
| 6,373,817 | B1 | 4/2002 | Kung et al. | 370/217 |
| 6,424,933 | B1 | 7/2002 | Agrawala et al. | 703/2 |
| 6,463,270 | B1 | 10/2002 | Chang et al. | 455/403 |
| 6,665,715 | B1 | 12/2003 | Houri | 709/223 |
| 6,748,426 | B1 * | 6/2004 | Shaffer et al. | 709/219 |
| 6,757,740 | B1 | 6/2004 | Parekh et al. | 709/245 |
| 6,829,230 | B1 * | 12/2004 | Tiuri | 370/400 |
| 6,829,654 | B1 | 12/2004 | Jungck | 709/246 |

(Continued)

OTHER PUBLICATIONS

Carpenter, B. et al., "IPv4 Address Behavior Today", RFC 2101, Feb. 1997.

(Continued)

*Primary Examiner*—Patrice Winder
(74) *Attorney, Agent, or Firm*—Merchant & Gould P.C.

(57) ABSTRACT

A system and method to determine the geographic location of a network user based on a plurality of network addresses and a plurality of mapping request information. The method involves receiving a plurality of mapping requests from a plurality of network users identified by a plurality of network addresses. A geographic location of a network user associated with a network address is then derived based on the plurality of network addresses and the plurality of mapping requests. In one embodiment, the network address is an Internet Protocol (IP) address. The method may be implemented, in one embodiment, as part of a system that executes as software on a computer.

20 Claims, 2 Drawing Sheets

U.S. PATENT DOCUMENTS

| | | | |
|---|---|---|---|
| 6,836,476 B1 | 12/2004 | Dunn et al. | 370/352 |
| 2002/0069420 A1 | 6/2002 | Russell et al. | 725/92 |
| 2004/0078490 A1 | 4/2004 | Anderson et al. | 709/245 |

OTHER PUBLICATIONS

Pacific Bell Internet, "Classless Inter-Domain Routing (CIDR) Overview", 1999.

Rekhter, Y. et al., "An Architecture for IP Address Allocation with CIDR", RFC 1518, Sep. 1993.

Hinden, R. et al., "IP Version 6 Addressing Architecture", RFC 2373, Jul. 1998.

Semeria, C., "Understanding IP Addressing: Everything You Ever Wanted To Know", 3com, 2000.

* cited by examiner

METHOD AND SYSTEM TO DETERMINE THE GEOGRAPHIC LOCATION OF A NETWORK USER

CROSS-REFERENCE TO RELATED APPLICATIONS

This application is a continuation of U.S. patent application Ser. No. 09/812,304 filed Mar. 19, 2001, now U.S. Pat. No. 7,062,572, issued Jun. 13, 2006. The contents of U.S. application Ser. No. 09/812,304 are hereby incorporated by reference in their entirety as if set forth herein in full.

BACKGROUND

1. Field of the Invention

This invention relates to the field of networked computers. More specifically, it relates to a system and method to determine the geographic location of a network user based on that user's current network (e.g., Internet Protocol (IP)) address and previously stored mapping request information obtained from related network addresses.

2. Background

The Internet and personal computers have become ubiquitous in modern society. People regularly access the Internet via personal computers and other devices for any number of purposes. Traditionally, most home and small business computer users have accessed the Internet via a modem plugged in to a telephone line that connects an Internet user to an Internet service provider (ISP). It is through the ISP that the Internet user receives an IP address and accesses the Internet.

At any given moment, each Internet host is uniquely identified by an Internet Protocol (IP) address and a domain name. The format of an IP address is a 32 bit numeric address which is expressed as four integer numbers, each separated by a dot, commonly referred to as dotted-decimal notation. Each number must be in the range from zero or one to 255; the first byte cannot be zero. For example, 209.1.25.249 is a valid IP address. It is the IP address that is used by underlying network software to identify a personal computer and other network hosts that communicate over the Internet.

Though the Internet Protocol has absolute requirements regarding the nature of the dotted decimal notation and how specific addresses become associated with specific pieces of network equipment, as a matter of practice, the organizations responsible for their allocation do so in substantial blocks of addresses. For example, when an ISP requests additional address space, the ISP normally receives a contiguous range of monotonically ascending addresses, rather than a totally random assortment of unrelated addresses. This administrative mechanism leads to the following result: addresses that differ only in the least significant, forth byte of the 32 bit address are almost always on the same local area network, and consequently, are physically located within a relatively short distance, such as a mile or so, from one another.

Prior art techniques exist that rely on indirect means to essentially guess the physical location of network devices based upon their IP address. For example, a utility called "whois" allows an Internet user to find out information about domain names and IP addresses including to whom the domain name and IP address is registered. Another utility called "tracert" allows an Internet user to trace the route of a data packet from the user to a remote host specified by the user. Yet another utility called "nslookup" allows an Internet user to look up the IP address of a domain name. In addition, there is a tool that provides the latitude and longitude of the geographic location of an Internet host. This tool, called "ip211," converts an IP address to latitude and longitude based on "whois" database information. More specifically, the city of the administrative contact for the IP address is obtained from a "whois" database and then converted into latitude and longitude. The address of the administrative contact is the mailing address of a party responsible for registration of the IP address and any associated domain name. This address may be geographically distant from the equipment over which the party has control, since one person can efficiently serve as the contact for nationally or globally distributed network equipment. Information regarding "ip211" is available from the Digital Computer Laboratory, Department of Computer Science, University of Illinois at Urbana-Champaign, 1304 West Springfield Avenue, Urbana, Ill. In contrast, network users are almost always physically located near network equipment accessed by local telephone calls to an ISP, as long distance telephone calls are expensive. No tools are currently available that allow an Internet user to be associated with a defined geographical area.

BRIEF SUMMARY OF THE INVENTION

A system and method to determine the geographic location of a network user based on a plurality of network addresses and a plurality of mapping request information. In one embodiment, the method involves receiving a plurality of mapping requests from a plurality of network users identified by a plurality of network addresses. A geographic location of a network user associated with a network address is then derived based on the plurality of network addresses and the plurality of mapping requests. In one embodiment, the network address is an Internet Protocol (IP) address. The method may be implemented, in one embodiment, as part of a system that executes as software on a computer.

DETAILED DESCRIPTION

A method and system for determining the geographic location of a network user is described. In one embodiment, the method involves making determinations of the geographic location of network users based on previously stored mapping request information from the same network address or a similar network address via a simple predictive heuristic. A confidence factor may be assigned to the result. The method also involves assembling a large number of passively collected observations about the affinity of network addresses for various locations. A newly or previously encountered network address is matched by the heuristic with previously observed behavior to arrive at the probable physical location of a network user identified by a network address.

Figure 1:
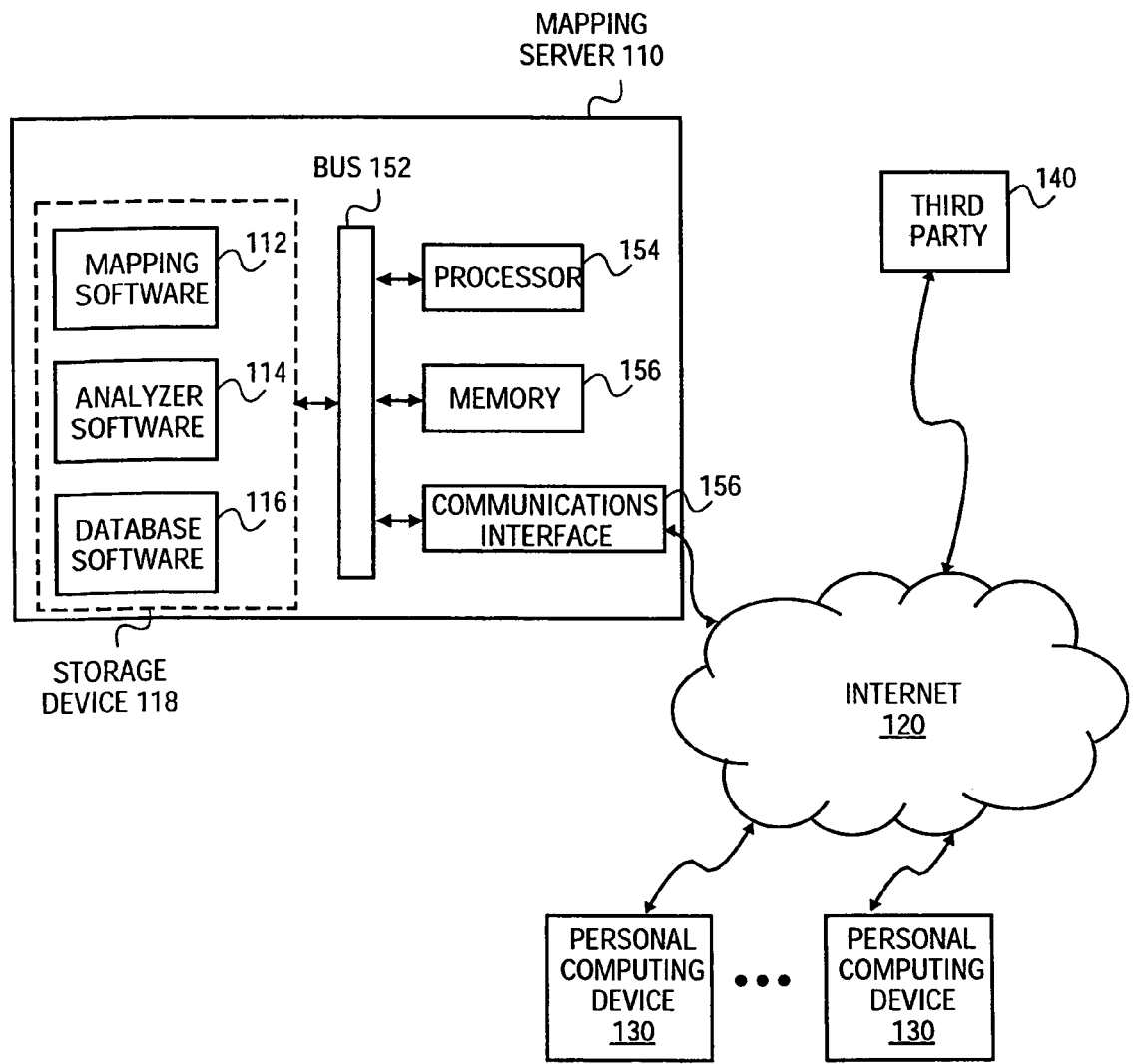
FIG. 1 depicts a network environment in which one embodiment of the method and system for determining the geographic location of a network user operates.

FIG. 1 depicts a network environment in which one embodiment of the method and system for determining the geographic location of a network user operates. In one embodiment, the process for determining the geographic location of a network user may be implemented in software that is stored on and runs in a mapping server computer 110. In other embodiments the process may be implemented in hardware or a combination of hardware and software. Mapping server computer 110 may be any server computer. In one embodiment, server computer 110 includes processor 154, memory 156, and communications interface 158 each of which is coupled to bus 152. Storage device 118 is also coupled to bus 152. Storage device 118 may be any readable and writeable non-volatile machine readable medium including, for example, magnetic media such as a hard disk drive, electronic media such a flash memory, optical memory such as a compact disk memory device, or any device that includes a machine readable medium.

In one embodiment, mapping server computer 110 may include mapping software 112 that processes mapping requests, analyzer software 114 that identifies geographic locations of network users, and database software 116 that may be used to store network user network address data and corresponding mapping requests issued by the network user. The database software may be any database, including for example, databases that provide support for the structured query language (SQL). In one embodiment, mapping software 112, analyzer software 114, and database software 116 are stored on a hard disk drive version of storage device 118. In one embodiment, the process for determining the geographic location of a network user is achieved by executing processor 154 using storage device 118 and memory 156 to execute mapping software 112, analyzer software 114, and database software 116. Although only single instances of the components of mapping server 110 are depicted, multiple processors, memory devices, storage devices, and other components, not shown, may be included in mapping server 110.

Mapping server computer 110 may be coupled to a network such as the Internet 120 or other global wide area network via communications interface 158. Communications interface 158 may be any device or adapter that allows to communication over a network such as the Internet, including, modems, network cards, and the like. Multiple personal computing devices 130 are coupled to the Internet and submit mapping requests which may be serviced by the mapping software on the mapping server 110. Personal computing devices 130 may be personal computers, personal digital assistants (PDAs), cellular telephones, computer tablets, or other computing devices capable of communicating over the Internet. As with mapping server 110, the computing devices each include a processor, memory, bus, communications interface, storage device, and other similar components.

Although mapping server computer 110 is depicted as a single computer, in another embodiment, multiple servers in a duster, local area network (LAN), subgroup, etc. may be used. In these embodiments, the multiple servers may include dedicated graphics servers, database servers, user interface servers, etc. and may be separated from the Internet or other network by a firewall, gateway, etc.

In one embodiment, the mapping software on the mapping server receives and satisfies numerous mapping requests received from personal computing devices and other network hosts, including other servers, not shown. In addition to responding to the mapping requests, the mapping software stores the mapping request data and corresponding network addresses via database software. This may be achieved according to well-known database methods via database software located on the mapping server or a dedicated database server included in a multiple server LAN, subgroup, etc.

The analyzer software determines the geographic location of network users based on the mapping request data and corresponding network addresses stored in the database. In one embodiment, the analyzer software delimits the entire world, or a portion thereof, into defined geographic regions and populates each of the regions with network addresses such as Internet Protocol (IP) addresses based on mapping requests issued from the IP address. That is, for each mapping request falling in a defined geographic region, the network address of the network user issuing the mapping request is associated with the particular geographic region in which the mapping request falls. Because of the way IP addresses have been allocated historically, IP addresses tend to cluster within a particular geographical region. The analyzer software may then determine which clusters or groupings of network addresses may be associated with particular geographic regions based on those geographic regions having the majority of occurrences of the particular network address.

In one embodiment, a common portion of an IP address is used in the analysis. In this embodiment, the first three numbers or bytes comprising 32 bit IP addresses may be used as the common portion of the IP address that is used in this analysis rather than the entire network address. In this embodiment, the correspondence between network addresses and mapping requests is analyzed based only on the first three bytes of the network address rather than the entire network address. In this way, groups or subgroups of addresses having a common portion may be found to predominate in certain geographic regions. That is, the techniques described herein exploits the fact that IP address that differ only in the forth byte of the 32 bit address are almost always on the same local area network. Consequently, addresses that differ only in the forth byte of the 32 bit address are generally physically located within a mile or so of one another. As discussed above, this is a result of the fact that IP addresses have been allocated in blocks of sequentially grouped addresses.

In one embodiment, the defined geographic region may be a 50 mile square area. However, various sizes of areas and geometric shapes may be used to define the geographic regions in various embodiments. In one embodiment, the geographic regions may be uniform in size. In another embodiment, the geographic regions may vary in size and/or shape based on the proximity to major cities, whether a region is densely populated, whether a region is sparsely populated, etc. In one embodiment, regions may be defined by population rather than area such that each region may be comprised of the same defined population such as 100,000 persons, 500,000 persons, 1,000,000 persons, etc.

A third party computer/server 140 which is also coupled to the Internet may request that the mapping server provide a network address to geographic location translation. The mapping server 110 may then respond with the requested geographic location pursuant to the techniques described herein. The geographic location may be specified as a latitude and longitude pair that may be the center of the particular geographic region, may be a geocode, or may be any other geographic or regional designation. The third party may then use the location information for any desired purpose, such as to display geographically relevant information to the Internet user including advertisements, a weather forecast pertinent to the user, local events of interest to the user, etc. In one embodiment, the mapping server may also include a content server component or other server component such that in response to receiving a request for a network address to geographic translation from a third party, a geographically relevant advertisement, weather report, events listing, or other information is also provided to the third party requestor, or may be provided directly to the user pursuant to instructions from the third party requestor.

Figure 2:
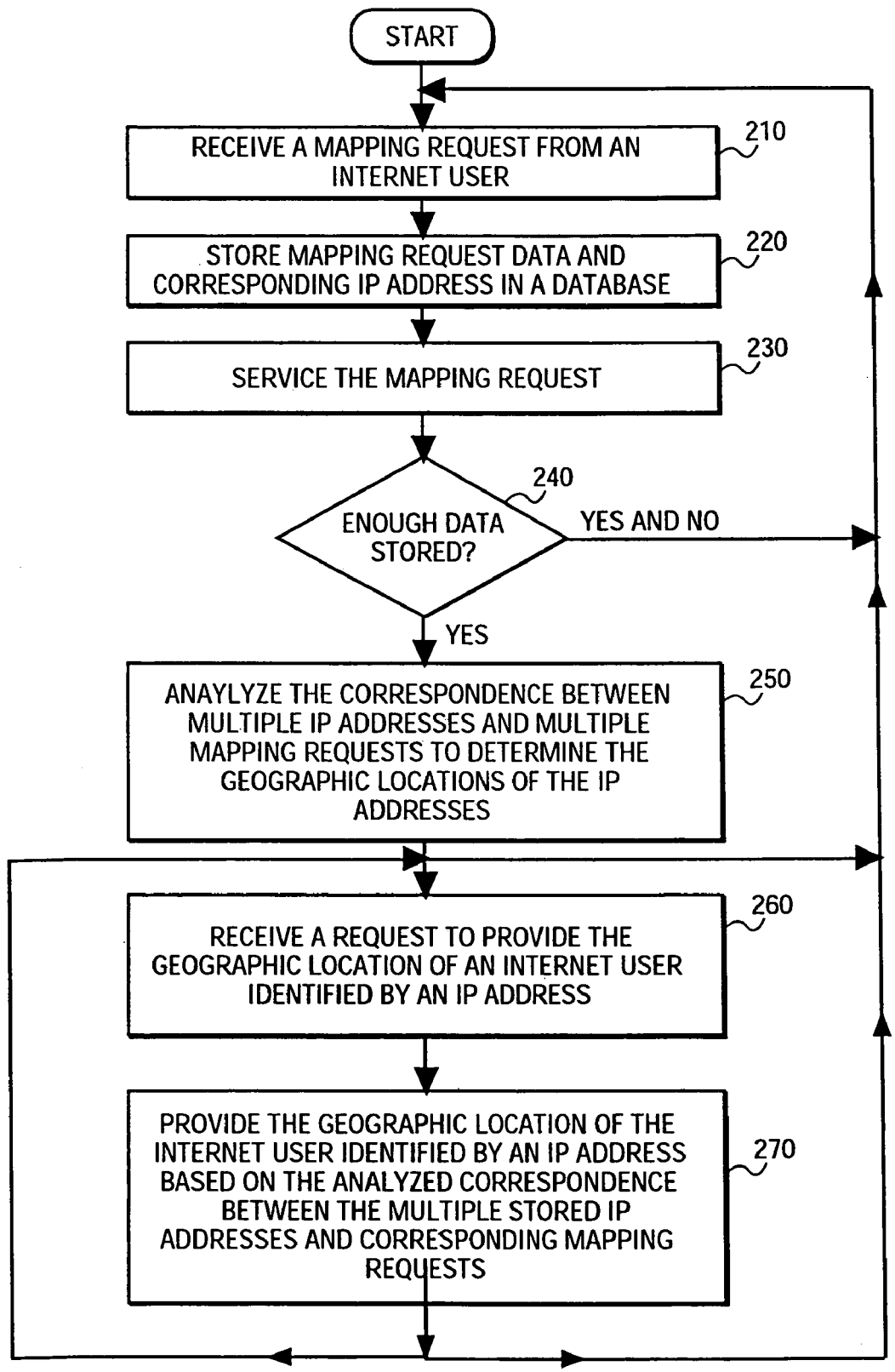
FIG. 2 depicts a flow diagram of one embodiment of a process for determining the geographic location of a network user.

FIG. 2 depicts a flow diagram of one embodiment of a process for determining the geographic location of a network user. The process is performed by processing logic that my comprise hardware, software, or a combination of both. A mapping server receives a mapping request from an Internet user that implicitly includes the IP address of the Internet user, as shown in block 210. The mapping server then stores mapping request data and the corresponding IP address of the Internet user, as shown in block 220. The mapping server services the mapping request, as shown in block 230. The details of servicing the mapping request are not described in detail herein so as not to obscure the present invention. A cycle of receiving, storing and servicing mapping requests as shown in blocks 210, 220 and 230 may proceed for many iterations. A check is then made to determine whether enough data has been stored, as shown in block 240. Whether there is enough stored data is based on a determination of whether a statistically sufficient sample has been stored. This determination may be made according to any well-known methods. Until there has been enough data stored so as to be able to statistically analyze multiple mapping requests and corresponding IP addresses, the mapping server continues to receive, store and service mapping requests, as shown in blocks 210, 220 and 230.

When enough data has been stored, the mapping server analyzes the correspondence between multiple IP addresses and multiple mapping requests to determine the geographic locations of the multiple IP addresses, as shown in block 250. This analysis and determination may occur regularly after a certain minimum amount of data sufficient for analysis is received, and may be constantly refined based on each mapping request received. In this way, the analysis constitutes an ongoing learning process. In one embodiment, only the most recent mapping requests and IP addresses are used. This helps to accommodate for temporary IP address assignment. In one embodiment, the most recent mapping requests and corresponding IP addresses may include all information received over a period of, for example, four days, one week, one month, three months, etc. Enough data is maintained so as to be able to provide an accurate result while also accounting for stale or no longer valid data resulting from the re-use of temporary IP addresses.

In one embodiment, database software may be used to maintain and analyze the pertinent mapping request data and corresponding IP addresses. In one embodiment, analyzer software may access the database software to obtain information needed to analyze or otherwise extrapolate or evaluate the correspondence between multiple IP addresses and multiple mapping requests. The analyzer software determines which geographic regions are associated with particular IP addresses or ranges of IP addresses in a simple, straightforward manner. The analyzer software assigns IP addresses to those geographic regions having the majority of mapping requests that originate from Internet users having the same or similar IP addresses. In one embodiment, the IP addresses are considered to be the same or similar when the IP addresses share the first three bytes of the dotted decimal version of the IP addresses. This may be referred to as the common portion of the IP addresses.

The mapping server may then receive a request to provide the geographic location of an Internet user identified by an IP address, as shown in block 260. The mapping server then provides the geographic location of the specified Internet user identified by an IP address based on the analyzed correspondence between the multiple stored IP addresses and corresponding mapping requests, as shown in block 270. In one embodiment, the geographic location provided by the mapping server may also be accompanied by an accuracy rating or confidence factor so that the recipient of the geographic location of the specified Internet user may better use the information provided. For example, the accuracy rating/confidence factor may be a percentage, a number from 1 to 10, a number from 1 to 5, a group of letters of the alphabet, or any other sliding scale that may be used to express an ordered relationship. The rating may reflect whether a strong or weak number of IP addresses make up a majority of the IP addresses associated with a geographic region. For example, if 10,000 mapping requests have been stored all of which have the same or similar first three bytes of IP address from originating users, and 5,000 of the mapping requests are for a first region, 3,000 of the mapping requests are for a second region, 1,000 requests are for a third region and 500 mapping requests are each for fourth and fifth regions, then a response to an IP address to location translation for an IP address having the same or similar IP address may include the first region and may include a high rating. The high rating may be appropriate as 50% of the mapping requests from the particular family of IP addresses fell into the particular region. The high rating may be understood contextually if the typical distribution of mapping requests for IP addresses results in a broad distribution among more than 10 regions such that no region typically has more than one-third of the mapping requests for a particular IP address range. This is only an example, and the accuracy and tuning of the system will vary over time, among geographic regions, and according to other factors.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A method for determining a geographic location for a network user, comprising:
    receiving a plurality of mapping requests from a plurality of network addresses;
    correlating a defined geographic location with each of the plurality of network addresses for each of the plurality of mapping requests;
    storing each defined geographic location and the correlated one of the plurality of network addresses in a database;
    receiving a request for a geographic location for a network user having a network address;
    querying the database to determine a correlated network address that is similar to the user's network address; and
    providing the defined geographic location correlated with the correlated network address similar to the user's network address as the geographic location for the network user.

2. The method of claim 1, wherein the plurality of mapping requests request one or more maps of defined geographic locations from a plurality of other network users identified by a plurality of associated network addresses.

3. The method of claim 1 further comprising:
    communicating geographically relevant information based on the defined geographic location.

4. The method of claim 1 wherein the network user is identified by an Internet Protocol (IP) address.

5. The method of claim 2 wherein correlating the defined geographic location comprises:
    assigning a first set of network addresses to a first defined geographic region based on the predominance of the plurality of network addresses that issued mapping requests included in the defined geographic region.

6. The method of claim 1 wherein correlating the defined geographic location comprises:
grouping those mapping requests sharing a common portion of the network address.

7. The method of claim 1 wherein the correlating is only performed for mapping requests received over a defined period of time.

8. The method of claim 1 wherein the correlating is only performed if the plurality of mapping requests comprises at least a minimum number of mapping requests.

9. A method for determining a geographic location for an Internet user, comprising:
receiving a plurality of mapping requests requesting one or more maps of defined geographic locations from a plurality of other Internet users identified by a plurality of associated Internet Protocol (IP) addresses;
correlating a defined geographic location with each of the plurality of associated IP addresses for each of the plurality of mapping requests;
storing each defined geographic location and the correlated each of the plurality of associated IP addresses in a database;
receiving a request for a geographic location for the Internet user having an IP address;
determining a correlated IP address stored in the database that is similar to the Internet user's IP address; and
providing the defined geographic location associated with the similar correlated IP address as the geographic location for the Internet user.

10. The method of claim 9 wherein correlating comprises;
assigning a grouping of IP addresses to defined geographic regions based on the predominance of the plurality of associated IP addresses that issued mapping requests included in the defined geographic region.

11. The method of claim 10 wherein the grouping of IP addresses comprises those mapping requests that share a common portion of the associated IP address.

12. The method of claim 11 wherein the common portion comprises the first three bytes of the associated IP address.

13. The method of claim 9 wherein the correlating is only performed for mapping requests received over a defined period of time.

14. The method of claim 9 wherein the correlating is only performed if a predetermined number of mapping requests have been received.

15. A machine readable medium having instructions stored thereon which when executed by a processor cause the processor to perform operations for determining a geographic location for a network user, the operations comprising:
receiving a plurality of mapping requests requesting one or more maps of defined geographic locations from a plurality of other network users identified by a plurality of associated network addresses;
correlating a defined geographic location with one of the plurality of associated network addresses for each of the plurality of mapping requests;
storing a defined geographic location and the correlated one of the plurality of associated network addresses in a database;
receiving a request for a geographic location for the network user having a network address;
querying the database to determine a correlated one of the plurality of associated network addresses that is similar to the network user's address; and
providing the defined geographic location correlated with the similar one of the plurality of associated network addresses as the geographic location for the network user.

16. The machine readable medium of claim 15 having further instructions thereon which cause the processor to perform further operations comprising:
communicating geographically relevant information based on the defined geographic location.

17. The machine readable medium of claim 15 wherein correlating the defined geographic location comprises:
assigning a first set of network addresses to a first defined geographic region based on the predominance of the plurality of associated network addresses that issued mapping requests included in the first defined geographic region.

18. The machine readable medium of claim 15 wherein correlating the defined geographic location comprises:
grouping those mapping requests sharing a common portion of an associated network address.

19. The machine readable medium of claim 15 wherein the correlating is only performed for mapping requests received over a defined period of time.

20. machine readable medium of claim 15 wherein the correlating is only performed if the plurality of mapping requests comprises at least a minimum number of mapping requests.

* * * * *

UNITED STATES PATENT AND TRADEMARK OFFICE
CERTIFICATE OF CORRECTION

| | | |
|---|---|---|
| PATENT NO. | : 7,657,655 B2 | Page 1 of 1 |
| APPLICATION NO. | : 11/440645 | |
| DATED | : February 2, 2010 | |
| INVENTOR(S) | : Thomas H. Hampton | |

It is certified that error appears in the above-identified patent and that said Letters Patent is hereby corrected as shown below:

In column 8, line 42, in Claim 20, before "machine" insert -- The --.

Signed and Sealed this
Tenth Day of May, 2011

David J. Kappos
*Director of the United States Patent and Trademark Office*